United States Patent
Shafer (10) Patent No.: US 6,217,002 B1
(45) Date of Patent: Apr. 17, 2001

(54) VALVE ASSEMBLY HAVING FLOATING RETAINER RINGS

(76) Inventor: Terry C. Shafer, 142 Wind Ridge Cir., Woodlands, TX (US) 77381

( * ) Notice: Subject to any disclaimer, the term of this patent is extended or adjusted under 35 U.S.C. 154(b) by 0 days.

(21) Appl. No.: 09/469,016

(22) Filed: Dec. 21, 1999

Related U.S. Application Data (63) Continuation of application No. 09/006,513, filed on Jan. 13, 1998, now Pat. No. 6,029,948.

(51) Int. Cl.$^7$ ........................................... F16K 5/06
(52) U.S. Cl. ........................ 251/171; 251/192; 251/314
(58) Field of Search .................................. 251/170, 171, 251/192, 315.01, 315.03, 315.05, 315.13, 315.15, 314

(56) References Cited

U.S. PATENT DOCUMENTS

| | | | |
|---|---|---|---|
| 2,841,429 | 7/1958 | McCuistion | 288/19 |
| 3,323,542 | 6/1967 | Magos et al. | 137/315 |
| 3,357,679 | 12/1967 | Gulick | 251/172 |
| 3,550,902 | 12/1970 | Pidgeon et al. | 251/151 |
| 3,556,474 | 1/1971 | Scaramucci | 251/172 |
| 3,584,641 * | 6/1971 | Milleville et al. | 251/315.05 |
| 3,656,711 * | 4/1972 | Toelke | 251/315.05 |
| 4,047,275 | 9/1977 | Bake | 97/175 |
| 4,099,705 | 7/1978 | Runyan | 251/171 |
| 4,103,865 * | 8/1978 | Nanba | 251/315.05 |
| 4,163,544 | 8/1979 | Fowler et al. | 251/328 |
| 4,260,131 * | 4/1981 | Kindersley | 251/315.05 |
| 4,269,391 | 5/1981 | Saito et al. | 251/315 |
| 4,327,895 | 5/1982 | Blumenkranz et al. | 251/315 |
| 4,345,739 | 8/1982 | Wheatley | 251/358 |
| 4,556,197 | 12/1985 | Kindersley et al. | 251/315 |

(List continued on next page.)

FOREIGN PATENT DOCUMENTS

| | | | |
|---|---|---|---|
| 0 051 993 A1 | 4/1982 | (EP) | F16K/5/20 |
| 0 310 402 A1 | 4/1989 | (EP) | F16K/5/06 |
| 0 623 770 A1 | 11/1994 | (EP) | F16K/5/06 |

OTHER PUBLICATIONS

"Polyethylene Valves," *Nordstrom Valves, Inc.*, (1995).

Primary Examiner—Kevin Shaver
Assistant Examiner—Eric Keasel
(74) Attorney, Agent, or Firm—Baker Botts L.L.P.

(57) ABSTRACT

A valve assembly including a valve housing having a fluid passageway extending through it. The fluid passageway has an inlet portion having a cross-section defined by a substantially annular inlet surface, an outlet portion having a cross-section defined by a substantially annular outlet surface, and an inner chamber portion defined by a substantially annular inner chamber surface, an inner wall, and an outer wall. The inner wall extends inwardly from the inner chamber surface to the inlet surface, and the outer wall extends inwardly from the inner chamber surface to the outlet surface. The inner chamber portion is positioned between and adjacent to the inlet and outlet portions. A valve member is located within the inner chamber portion and is movable between a closed position in which the fluid passageway is blocked, and an open position in which the fluid passageway is not blocked. First and second substantially annular retainer ring assemblies are also located within the inner chamber portion, and rotatably position the valve member within the inner chamber portion. The first and second retainer ring assemblies provide first and second fluid seals between the valve member and the inner chamber surface at the first and second ends of the inner chamber portion respectively. The first and second retainer ring assemblies each include a floating retainer ring and a plurality of sealing members. The floating retainer rings are movable relative to the valve member, the inner chamber surface, and the inlet and outlet walls.

3 Claims, 5 Drawing Sheets

U.S. PATENT DOCUMENTS

| | | | |
|---|---|---|---|
| 4,572,515 | 2/1986 | Grazioli | 277/12 |
| 4,658,847 | 4/1987 | McCrone | 137/72 |
| 4,667,926 * | 5/1987 | Takeda et al. | 251/170 |
| 4,678,161 * | 7/1987 | Bando et al. | 251/171 |
| 5,046,703 | 9/1991 | Kamiyama et al. | 251/368 |
| 5,104,092 * | 4/1992 | Block et al. | 251/315.05 |
| 5,396,922 | 3/1995 | Ottens | 137/454.2 |
| 5,655,892 | 8/1997 | Cherniawski et al. | 417/292 |
| 6,029,948 | 2/2000 | Shafer | 251/171 |

* cited by examiner

VALVE ASSEMBLY HAVING FLOATING RETAINER RINGS

This is a continuation of application Ser. No. 09/006,513, filed on Jan. 13, 1998 U.S. Pat. No. 6,029,948.

FIELD OF THE INVENTION

The present invention relates to a valve assembly, and more particularly to a valve assembly having a valve member rotatably positioned within a valve housing by retaining ring assemblies that include floating retainer rings.

BACKGROUND

Valve assemblies, such as ball valve assemblies, are well known and have been used for a variety of applications. Such ball valve assemblies commonly include a ball valve that is securely, but rotatably positioned within a housing by a seating or retaining member. Traditionally, the valve assembly and the piping to which the valve assembly is connected have been made of steel or other metal material, but recently thermoplastic piping has become increasingly popular. Thermoplastic piping is desirable for various reasons such as reduced cost, the non-corrosive nature of thermoplastics, and the fact that thermoplastic parts have a longer useful life than do their metal counterparts. Further, thermoplastic piping is easier to install and repair, since adjoining sections of pipe can quickly and easily be butt-welded together. Thus, it is now desirable to also have thermoplastic valve assemblies for use in conjunction with thermoplastic piping.

Designing thermoplastic valve assemblies is more complicated, however, due to the fact that thermoplastic materials tend to expand and contract with variations in both temperature and pressure. The rate and amount of expansion and contraction will depend on various factors, such as the particular type of thermoplastic used, the coefficient of thermal expansion of the thermoplastic, and the physical dimensions of the element. Accordingly, in a thermoplastic valve assembly, the relatively thin thermoplastic housing will typically expand in diameter more rapidly as temperature increases than will other elements of the valve assembly, such as the ball valve or seating member. Thus, during normal operation the physical relationship or the physical "fit" between the various elements of the valve assembly may change. For example, due to their differing shapes and masses, the housing will typically expand radially at a rate greater than that of the ball valve. Under such circumstances, it is difficult to ensure that the fluid seals between the ball valve and the surrounding housing remain intact, since the seating member may expand at a different rate, or if it is physically secured to another element such as the housing, it may move with that element. In addition, in the case of a thermoplastic ball valve, the ball itself, due to its shape, will be particularly subject to thermal or pressure deformation in the areas surrounding its inlet and outlet openings, known as the "lip" regions, since the material thickness is lowest in this area. Deformation of these lip areas will cause flaring that will affect both fluid flow through the valve and the integrity of the ball valve itself. Further, flaring of the lip areas will also prevent the valve from opening and closing properly. Thus, in a thermoplastic ball valve assembly it is also important to maintain the positioning and the structural integrity of the ball valve under all operating conditions.

Figure 1:
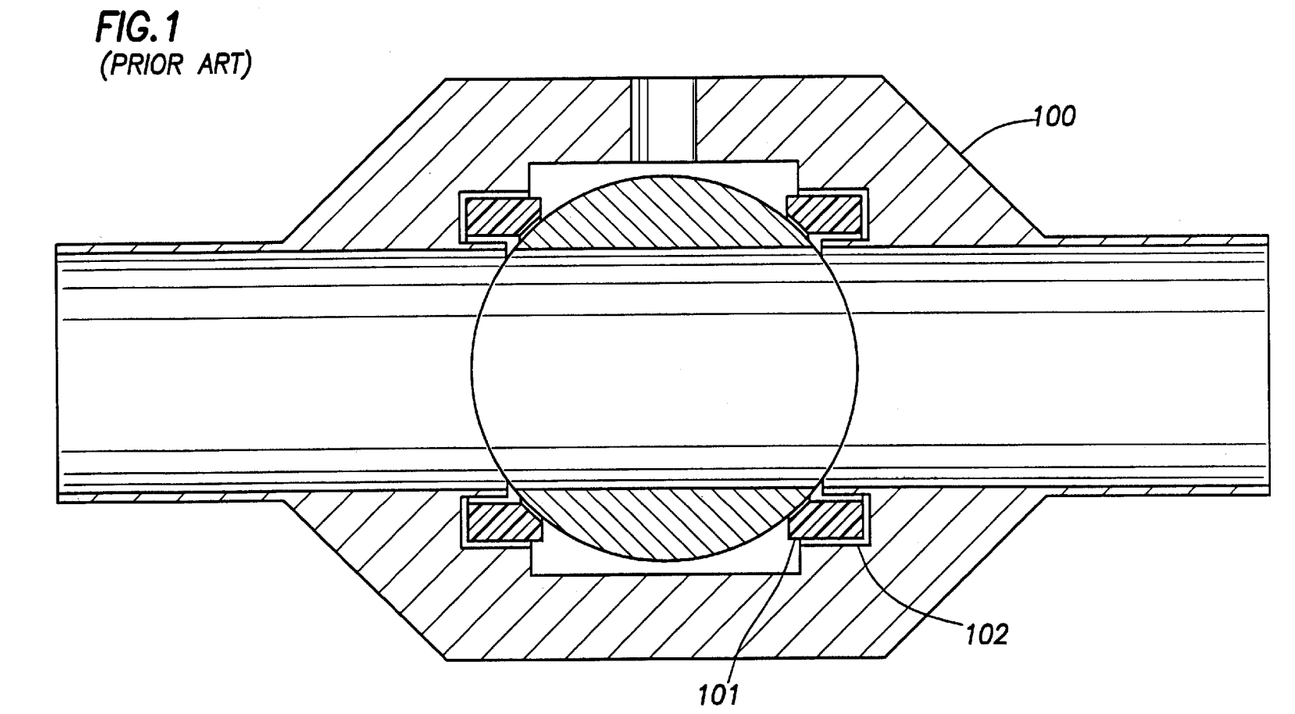
FIG. 1 illustrates a prior art thermoplastic ball valve assembly.

Known thermoplastic ball valve assemblies, such as that shown in FIG. 1, have provided a thermoplastic housing 100, with thermoplastic seating members 101 that are positioned within a recess or groove 102 in the housing itself, and thus are physically secured to the housing. Such a configuration does not solve the problems described above, since the movement of the housing (such as by expansion) directly corresponds to movement of the seating members. Thus, as the housing expands, the seating member that is secured to the housing tends to move with it, being drawn away from the ball valve. As described above, this has the disadvantage of affecting the fluid seals between these elements, and also decreases the ability of the seating member to ensure the proper positioning and the physical integrity of the ball valve, particularly around the lip areas, under all operating conditions.

Thus, known thermoplastic ball valve assemblies have been unable to account for large variations in temperature or pressure, and therefore, have been limited to applications involving relatively mild operating conditions, ie., uses under which temperature and/or pressure variations are relatively insubstantial. These devices are simply unsuitable for many applications in which thermoplastic piping is otherwise desirable, such as the water market, where operating conditions as well as testing requirements are much more severe.

SUMMARY OF THE INVENTION

Accordingly, a need currently exists for a valve assembly that includes floating retainer rings that both maintain their physical "fit" in relation to the valve member, and that ensure the structural integrity of the valve member during all normal operating conditions, including operating conditions under which large variations in temperature and/or pressure can be expected. Further, a need currently exists for such a valve assembly that can be made of thermoplastic materials.

In accordance with the present invention, a valve assembly is provided that comprises a valve housing having a fluid passageway extending therethrough. The fluid passageway includes an inlet portion, the cross-section of which is defined by a substantially annular inlet surface; an outlet portion, the cross-section of which is defined by a substantially annular outlet surface; and an inner chamber portion that is positioned between and adjacent to the inlet and outlet portions and has an inlet end and an outlet end. The inner chamber portion is defined by a substantially annular inner chamber surface, an inlet wall, and an outlet wall. The inlet wall extends inwardly from the inner chamber surface to the inlet surface, and the outlet wall extends inwardly from the inner chamber surface to the outlet surface. A valve member is located within the inner chamber portion of the fluid passageway, and is movable between a closed position in which the fluid passageway is blocked, and an open position in which the fluid passageway is not blocked.

The valve assembly further includes first and second substantially annular retainer ring assemblies located within the inner chamber portion of the fluid passageway for rotatably positioning the valve member within the inner chamber portion. The first retainer ring provides a first fluid seal between the valve member and the inner chamber surface at the first end of the inner chamber portion, and the second retainer ring provides a second fluid seal between the valve member and the inner chamber surface at the second end of the inner chamber portion. The first and second retainer ring assemblies each include a floating retainer ring and a plurality of sealing members. The floating retainer rings are spaced apart from and movable relative to the inner chamber surface and the inlet and outlet walls. A first one of the plurality of sealing members of the first and second retainer ring assemblies forms a fluid seal between the respective floating retainer ring and the inner chamber surface; a second one of the sealing members of the first retainer ring assembly forms a fluid seal between the floating retainer ring of the first retainer ring assembly and the inner wall; a second one of the sealing members of the second retainer ring assembly forms a fluid seal between the floating retainer ring of the second retainer ring assembly and the outer wall; and a third one of the sealing members of the first and second retainer ring assemblies forms a fluid seal between the respective floating retainer ring and the valve member.

In one embodiment of the present invention the valve housing has a coefficient of thermal expansion, and the first and second floating retainer rings have a coefficient of thermal expansion that is lower than that of the valve housing. Further, the sealing members are sufficiently compressed so that the first and second fluid seals are maintained if the valve housing expands during normal operation of the valve assembly.

In yet another embodiment of the present invention, the valve assembly includes a similarly configured valve housing having a fluid passageway extending through it, and a valve member located within the inner chamber portion of the fluid passageway that is movable between a closed position in which the fluid passageway is blocked, and an open position in which the fluid passageway is not blocked. The inner chamber surface includes a threaded portion at the outlet end of the inner chamber portion. The valve assembly also includes first and second substantially annular retainer ring assemblies located within the inner chamber portion of the fluid passageway for rotatably positioning the valve member within the inner chamber portion. The first retainer ring assembly provides a first fluid seal between the valve member and the inner chamber surface at the first end of the inner chamber portion, and the second retainer ring assembly provides a second fluid seal between the valve member and the inner chamber surface at the second end of the inner chamber portion.

This alternate embodiment further includes a substantially annular securing ring positioned within the inner chamber portion of the fluid passageway. The securing ring has a hole through it, a threaded outer edge, an outer side, and an inner side. The outer edge is threadably engaged with the threaded portion of the inner chamber surface, and the outer side is substantially aligned with and substantially complementary to the outer wall.

First and second retainer ring assemblies of the valve assembly each have a floating retainer ring and a plurality of sealing rings. The floating retainer rings are spaced apart from and movable relative to the valve member, and relative to the inner chamber surface and the said inlet and outlet walls. A first one of the plurality of sealing rings of the first and second retainer ring assemblies forms a fluid seal between the respective floating retainer ring and the inner chamber surface; a second one of the plurality of sealing rings of the first retainer ring assembly forms a fluid seal between the first floating retainer ring and the inner wall; a second one of the plurality of sealing rings of the second retainer ring assembly forms a fluid seal between the second floating retainer ring and the outer side of said securing ring; and a third one of the plurality of sealing rings of the first and second retainer ring assemblies forms a fluid seal between the respective floating retainer ring and the valve member.

BRIEF DESCRIPTION OF THE DRAWINGS

For a more complete understanding of the present invention and the advantages thereof, reference is now made to the following description taken in conjunction with the accompanying drawings in which like reference numbers indicate like features wherein.

DETAILED DESCRIPTION

Figure 2:
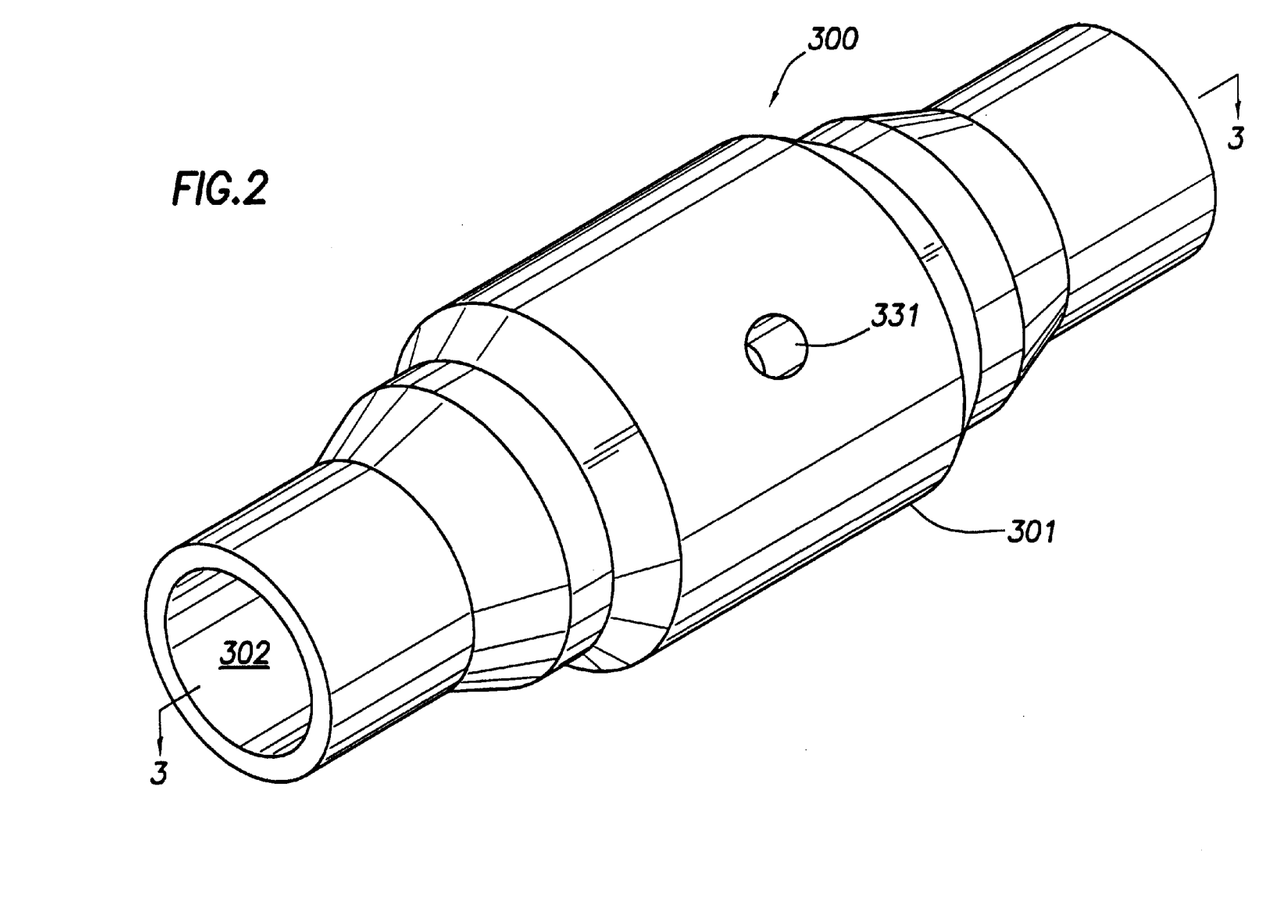
FIG. 2 is an exterior view of one embodiment of a valve assembly according to the present invention.
Figure 3:
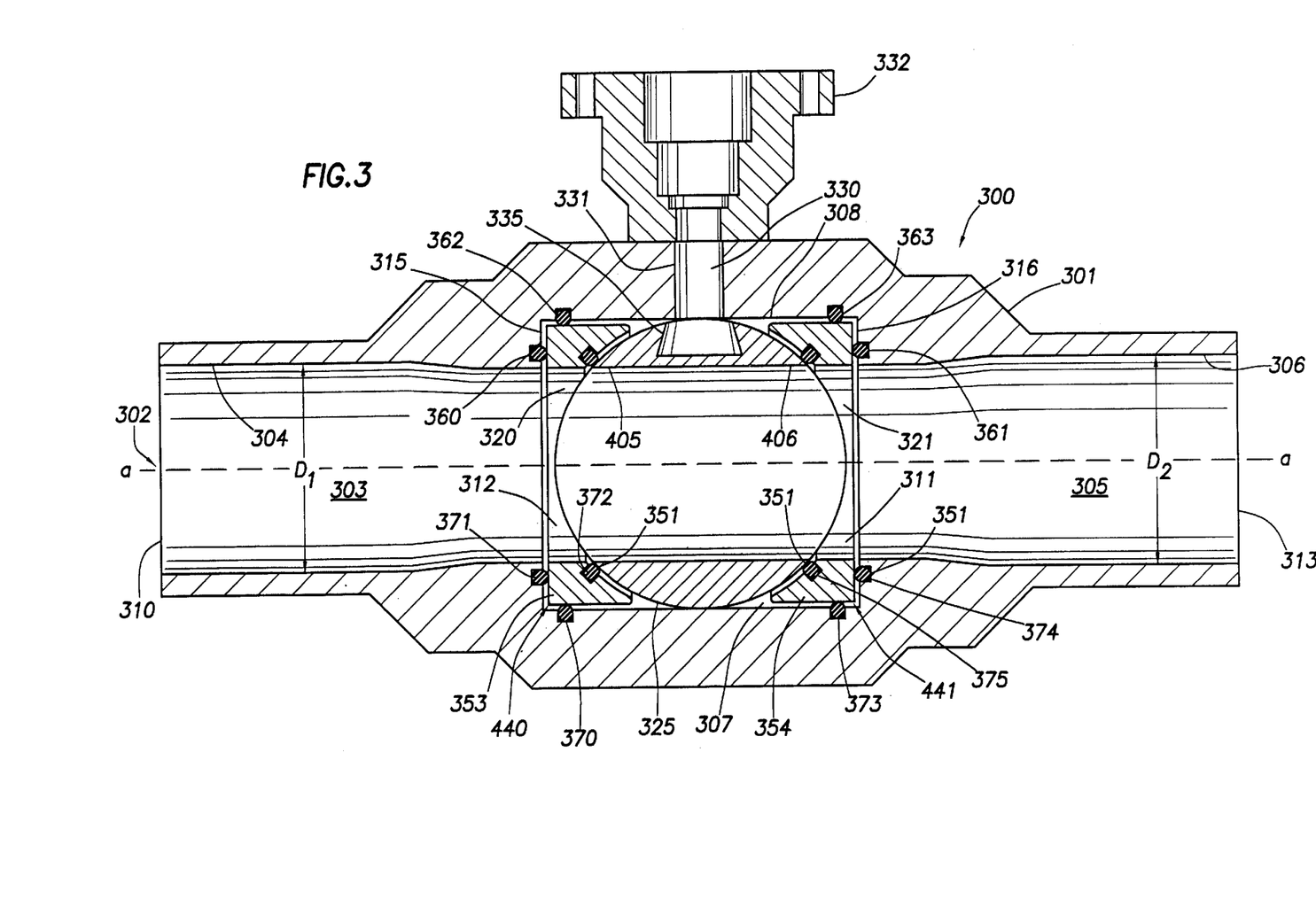
FIG. 3 is a cross-sectional view of the valve assembly of FIG. 2, taken along line A—A.

FIG. 2 is an exterior view of one embodiment of a valve assembly according to the present invention, and FIG. 3 is a cross-sectional view of the valve assembly of FIG. 2 taken along line A—A. The valve assembly 300 includes a valve housing 301 having a fluid passageway 302 extending through it that lies along a central axis a—a. The fluid passageway 302 includes an inlet portion 303, the cross-section of which is defined by the substantially annular inlet surface 304 of the valve housing, and an outlet portion 305, the cross-section of which is defined by the substantially annular outlet surface 306 of the valve housing 301. Both the inlet and outlet portions of the fluid passageway have a first inlet end 310, 311 and a second outlet end 312, 313. The fluid passageway 302 further includes an inner chamber portion 307 that is positioned between and adjacent to the inlet and outlet portions, which is defined by the substantially annular inner chamber surface 308 of the valve housing, and the inner wall 315 and outer wall 316 of the valve housing. The inner chamber portion 307 also has a first inlet end 320 and a second outlet end 321.

The inner wall 315 extends inwardly from the inner chamber surface 308 to the inlet surface 304 at the outlet end 312 of the inlet portion of the fluid passageway so as to form a substantially continuous surface. Likewise, the outer wall 316 extends inwardly from the inner chamber surface 308 to the outlet surface 306 of the outlet portion 305 of the fluid passageway so as to form a substantially continuous surface.

Although the inner 315 and outer 316 walls, as shown in FIG. 3, are substantially perpendicular to the inner chamber surface 308, other configurations, such as angled walls or walls having multiple surfaces, are also possible. Similarly, the diameters of the inlet and outlet portions D1, D2 of the fluid passageway may be substantially the same, and substantially constant along the length of the inlet and outlet portions as shown in FIG. 3, but may also differ from one another, or vary along the length of the respective portions.

Figure 4:
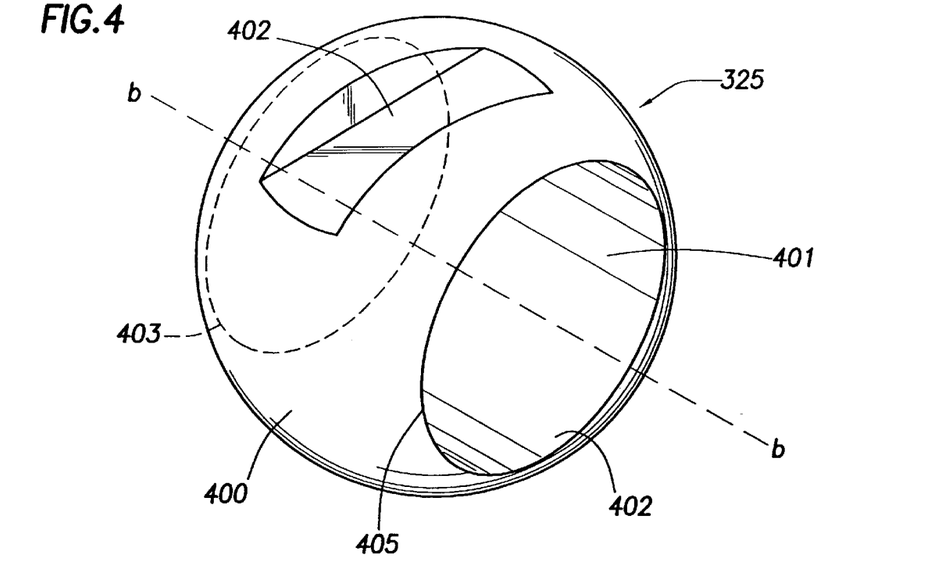
FIG. 4 illustrates a ball valve that forms part of the valve assembly.

Within the inner chamber portion 307 is a valve member, such as a ball valve 325. The ball valve 325, shown separately in FIG. 4, is substantially spherical in shape, has an outer ball valve surface 400, and a valve hole 401 extending through it that is concentric with a central axis b-b. The valve hole 401 has an inlet end 402 and an outlet end 403. Extending from the ball valve is a stem 330 (FIG. 3) that extends through an aperture 331 in the valve housing to the exterior of the valve housing. The stem cooperates with a handle 332 that is located outside the valve housing 301. In the embodiment shown in FIG. 3, the stem is engaged with the ball valve by means of an enlarged portion 335 that cooperates or mates with a similarly shaped groove 402 in the ball valve 325 (FIG. 4). Thus, when the stem 330 is rotated by means of the handle 332, the ball valve will also rotate between open and closed positions. As will be described in more detail below, the ball valve is rotatably positioned with the inner chamber portion 307 of the fluid passageway so that in the closed position the outer surface 400 of the ball valve completely obstructs the fluid passageway, thereby preventing fluid that is flowing through the fluid passageway from passing from the inlet portion 303 to the outlet portion 305 of the fluid passageway. In the open position, the ball valve is rotated so that the valve hole 401 is oriented such that fluid flow between the inlet portion 303 and the outlet portion 305 of the fluid passageway is not entirely obstructed. In a fully open position, the valve hole 401 is oriented so that its central axis b—b is substantially parallel to the central axis a—a of the fluid passageway 302. In a partially open position, the central axis b—b will be at an angle relative to the central axis of the fluid passageway.

The ball valve also includes an inlet lip region 405 and an outlet lip region 406 (FIGS. 3 and 4) that surrounds the valve hole 401 at its inlet 402 and outlet 403 ends. The thickness of the ball valve material in these lip regions is substantially less than that of other regions, as can be readily seen in FIGS. 3 and 4. Thus, the lip regions are particularly subject to deformation at elevated temperatures and/or pressures, and tend to flare out when so deformed if not otherwise restrained. According to the present invention, these lip regions are restrained from flaring by the retainer ring assemblies described below.

As stated, the ball valve is positioned within the inner chamber 307 of the fluid passageway 302. It is securely, but rotatably held in place by first 440 and second 441 substantially annular retainer ring assemblies. The first retainer ring assembly 440 is positioned within the first inlet end 320 of the inner chamber portion 307 of the fluid passageway, and forms a fluid seal between the ball valve 325 and the inner chamber surface 308 that substantially prevents any fluid that is flowing through the fluid passageway from reaching the inner chamber surface. Likewise, the second fluid retainer ring assembly 441 is positioned within the second outlet end 321 of the inner chamber portion 307 of the fluid passageway, and forms a fluid seal between the ball valve 325 and the inner chamber surface 308 on the downstream or outlet end 321 of the inner chamber portion 307.

Figure 5A:
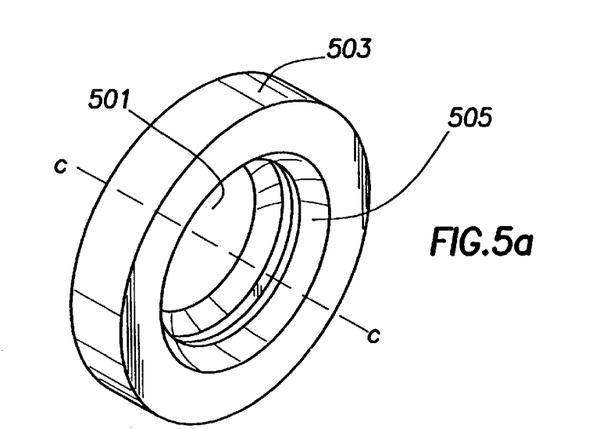
FIG. 5a illustrates one embodiment of a floating retainer ring that forms part of the valve assembly.
Figure 5B:
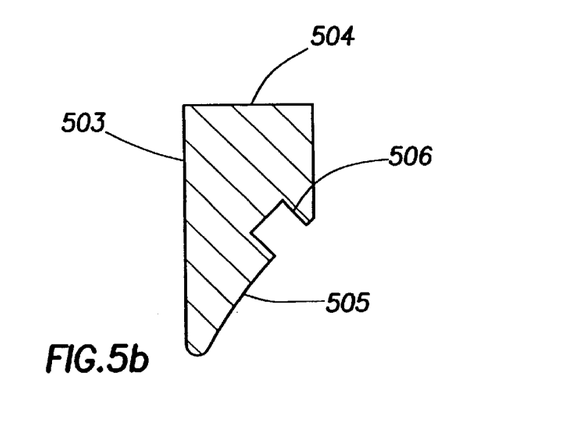
FIG. 5b is a cross-sectional view of a portion of a floating retainer ring.

The first and second retainer ring assemblies each further comprise substantially annular first 353 and second 354 floating retainer rings respectively, and a plurality of sealing members 351. The floating retainer rings 353, 354 shown in FIG. 3 are shown in greater detail in FIGS. 5a and 5b. The floating retainer rings are substantially annular in shape and have a substantial annular hole 501 therethrough that is concentric with a central axis c—c. The floating retainer rings further include at least a first outer ring surface 503, a second side ring surface 504, and a third valve 10 surface 505. When positioned within the valve housing 301, the central axis c—c is substantially coincident with the central axis a—a of the fluid passageway, and the first outer ring surface 503 of each floating retainer ring is substantially aligned with and substantially complementary to a respective portion of the inner chamber surface 308 of the valve housing 301. Similarly, the second side ring surface 504 of the first floating retainer ring 353 is substantially complementary to the inner wall 315, and the second side surface of the second floating retainer ring 354 is substantially aligned with and substantially complementary to the outer wall 316. The third valve surface 505 of each floating retainer ring is substantially aligned with and substantially complementary to a respective portion of the outer surface 400 of the ball valve 325.

The three surfaces of the floating retainer rings are substantially aligned with the corresponding surfaces of the valve housing 301 and the ball valve 325 as described above, but are also slightly spaced apart from these corresponding surfaces, as shown in FIG. 3. Positioned between and cooperating with the floating retainer rings and each of the corresponding surfaces is at least one sealing member, such as an O-ring. These O-rings are of a sufficient size to form a fluid seal between the respective members. In the embodiment of the present invention shown in FIG. 3, the inner 315 and outer 316 walls have a substantially annular recess or groove 360, 361 therein; the inner chamber surface 308 has a first 362 and second 363 substantially annular recess or groove therein; and the third valve surface 505 of each of the floating retainer rings also has a substantially annular recess or groove 506 therein. These recesses or grooves are sized and positioned so that an O-ring may be positioned partially within the groove, but yet also protrude from the groove, as shown in FIG. 3. For example, the first retainer ring assembly 440 includes a first O-ring 370 that fits partially within and protrudes from the first inner chamber surface recess 362. It protrudes from the groove so that it also communicates with the first outer ring surface 503 of the first floating retainer. ring 353. A second O-ring 371 similarly is positioned partially within the inner wall recess 360 and communicates with the second side ring surface 504 of the first floating retainer ring, and a third O-ring 372 is positioned partially within the third valve surface recess 506 of the first floating retainer ring 353 and communicates with the outer surface of the ball valve 400. The first, second and third O-rings 373, 374, 375 of the second floating retainer ring assembly 441 are similarly positioned partially within the corresponding recesses, and communicate with the corresponding surfaces.

In the configuration described above, the floating retainer rings are "floating" in that they are not secured to or integral with either the ball valve or the valve housing, and therefore, may independently move relative to each of these members. The "floating" nature of the floating retainer rings is particularly advantageous in a thermoplastic valve assembly, when various members of the valve assembly move relative to one another when expanding or contracting in response to variations in temperature or pressure. According to one embodiment of the present invention, the valve housing 301 is comprised of a thermoplastic material, preferably polyethylene. The ball valve and the floating retainer rings are also comprised of a thermoplastic material, preferably polypropylene, which may be glass filled for added strength if desired. The thermoplastic material selected for the floating retainer rings has a coefficient of thermal expansion such that the floating retainer rings will remain substantially free from expansion or contraction under normal operating conditions. Thus, because the ball valve (also polypropylene) and the floating retainer rings substantially retain their shape and size, the valve surface 505 of the floating retainer rings 350 and the corresponding outer surface 400 of the ball valve 325 will remain substantially complementary during all normal operating conditions.

Although the floating retainer rings 350 and the ball valve 325 do not substantially expand or contract during normal operation, typically a valve housing comprised of polyethylene will undergo a certain amount of expansion, particularly when used for applications having more severe operating conditions, such as in the water market. To account for this variation, the O-rings are sized sufficiently so as to maintain a seal between the valve housing and the floating retainer rings, both of which have different coefficients of thermal expansion. The O-rings are sufficiently compressed so that when the valve housing expands, the O-rings will expand to ensure that the fluid seal is always maintained between the surfaces of the floating retainer rings and the corresponding surfaces of the ball valve or valve housing. To serve this purpose the O-rings maybe comprised of EPDM or Buna N.

As is readily apparent from the above description, the valve assembly of the present invention is advantageous because the floating retainer rings are "floating", rather than integral or otherwise secured to the valve housing. Thus, the floating retainer rings may at all times move independent of these members to maintain the proper orientation and the proper complementary fit to the corresponding surfaces, rather than moving with another member as that other member expands or contracts. Thus, in conjunction with the compressed O-rings that will expand sufficiently to ensure that a fluid seal is maintained, the floating retainer rings ensure that the ball valve is properly positioned and its physical integrity sufficiently preserved at all times. With regard to the latter feature, it can be seen in FIG. 3 that the third O-ring 371, 375 of the first and second retainer ring assemblies is positioned adjacent the inlet 405 and outlet 406 lip regions of the ball valve 325 respectively, thereby assuring the structural integrity of the lip regions by preventing flaring of these regions. Because the floating retainer rings are floating rather than physically secured to another member such as the housing, the physical relationship between the ball valve and the floating retainer rings is maintained during expansion and contraction, as described above, and the proper positioning of the O-rings against the lip regions will also be maintained.

Figure 6:
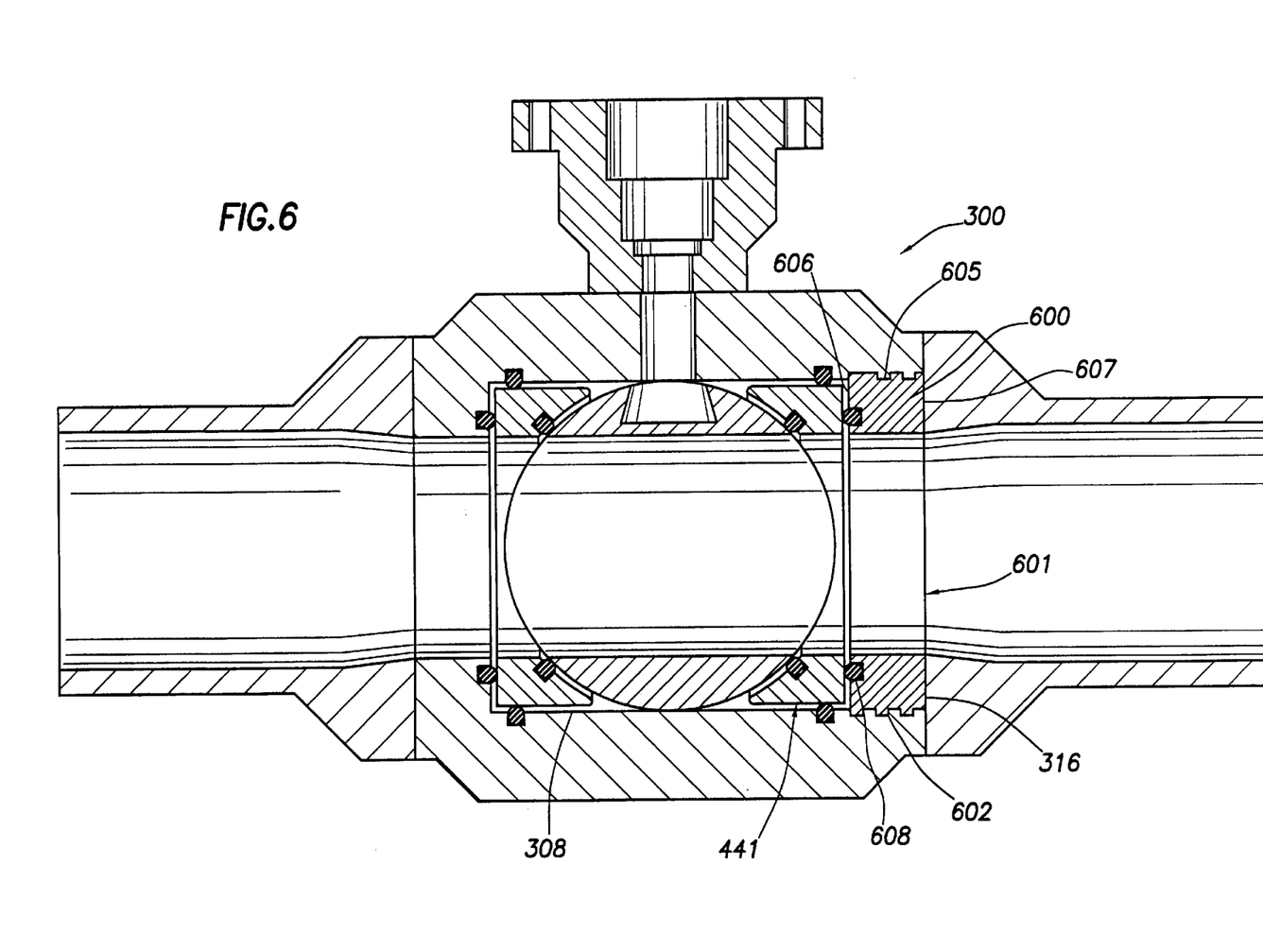
FIG. 6 is a cross-sectional view of another embodiment of a valve assembly according to the present invention that includes a securing ring.

In an alternate embodiment shown in FIG. 6, the valve assembly 300 also includes a securing ring 600 that is positioned within the inner chamber portion 307 of the fluid passageway 302. The securing ring 600 is substantially annular in shape, and has a hole 601 therethrough that is substantially equal in diameter to that of the outlet portion 305 of the fluid passageway 302. In this embodiment, the inner chamber surface 308 includes a threaded portion 605 at the second outlet end 321 of the inner chamber portion 307, and the securing ring 600 has a threaded outer edge 602 that is threadably engageable with the threaded portion 605 of the inner chamber surface 308. The securing ring 600 also includes an inner side edge 606 and an outer side edge 607. The securing ring 600 is positioned between the second retainer ring assembly 441 and the outer wall 316, such that the second side ring surface 504 of the second floating retainer ring 354 is substantially aligned with and substantially complementary to the inner side edge 606 of the securing ring 600 rather than the outer wall 316, and the outer side edge 607 of the securing ring 600 is substantially aligned with and substantially complementary to the outer wall 316. Further, the second O-ring 374 of the second retainer ring assembly 441 that cooperates with the second side ring surface 504 also cooperates with the inner side edge 606 of the securing ring 600 rather than the outer wall 316, and is positioned partially within and protruding from a substantially annular groove 608 in the inner side edge of the securing ring.

According to the above-described embodiment, a valve assembly according to the present invention may be assembled in the following manner. The first and second O-rings 370, 371 of the first retainer ring assembly 440 are inserted into the respective recesses in the inner chamber surface 308 and the inner wall 315. The first floating retainer ring 353, along with the third O-ring 371 are inserted next, followed by the ball valve 325. Subsequently, the first O-ring of the second retainer ring assembly 441, and the second floating retainer ring 354 along with the third O-ring 375 of the second retainer ring assembly 441 are inserted. The securing ring along with the second O-ring 374 of the second retainer ring assembly 441 are then inserted by threadably securing the threaded outer edge 602 of the securing ring to the threaded position 605 of the inner chamber surface. Finally, the remaining section of the valve housing 301 that surrounds and encloses the outer portion 305 of the fluid passageway 302 is secured to the rest of the valve housing by means of welding, bolting or the like.

Accordingly, a valve assembly is provided having floating retainer rings that ensure the proper positioning and operation of a ball valve within the pipe housing. The above-described configurations of the valve assembly are particularly suited for valve assemblies that are made of thermoplastic materials, and increase the range of applications for which thermoplastic valves may be used.

Other modifications of the invention described above will be obvious to those skilled in the art, and it is intended that the scope of the invention be limited only as set forth in the appended claims.

What is claimed is:

1. A valve assembly comprising:

a.) a valve housing having a fluid passageway extending therethrough, said fluid passageway having an inlet portion, a cross-section of which is defined by an inlet surface, an outlet portion, a cross-section of which is defined by an outlet surface, and an inner chamber portion positioned between and adjacent to said inlet and outlet portions, said inner chamber surface having a first and second end, said inner chamber portion being defined by a substantially annular inner chamber surface, an inner wall, and an outer wall, said inner wall extending inwardly from said inner chamber surface to said inlet surface, and said outer wall extending inwardly from said inner chamber surface to said outlet surface, said valve housing having a first coefficient of thermal expansion;

b.) a valve member located within said inner chamber portion of said fluid passageway, said valve member being movable between a closed position wherein said fluid passageway is blocked, and an open position wherein said fluid passageway is not blocked; and c.) first and second substantially annular retainer ring assemblies located within said inner chamber portion of said fluid passageway, said first retainer ring assembly providing a first fluid seal between said valve member and said inner chamber surface at said first end of said inner chamber portion, and said second retainer ring assembly providing a second fluid seal between said valve member and said inner chamber surface at said second end of said inner chamber portion of said fluid passageway;

said first and second retainer ring assemblies each having a floating retainer ring and a plurality of sealing members, said floating retainer rings being movable both laterally and perpendicularly relative to said valve member, said inner chamber surface, and said inner and outer walls, and having a lower coefficient of thermal expansion than that of said valve housing;

each of said sealing members being compressible and sized to maintain said first and second fluid seals during operation of said valve assembly, said sealing members of each retainer ring assembly positioned adjacent said respective floating retainer rings to accommodate movement of said valve member both laterally and perpendicularly relative to said valve housing;

said sealing members protruding from said retainer ring assemblies to accommodate compression of said sealing members in order to maintain said first and second fluid seals during operation of the valve assembly.

2. A valve assembly according to claim 1, wherein said valve member is a ball valve having an outer surface and a substantially annular valve hole therethrough, said ball valve having an inlet lip portion surrounding said substantially annular hole at an inlet side, and an outlet lip portion surrounding said substantially annular hole at an outlet side.

3. A valve assembly according to claim 2, wherein each of said first and second floating retainer rings further comprise at least first, second and third surfaces, said first surfaces being substantially aligned with and substantially complementary to respective portions of said inner chamber surface, said second surface of said first and second floating retainer rings being substantially aligned with and substantially complementary to said inner and outer walls respectively, and said third surface being substantially aligned with and substantially complementary to respective portions of said outer surface of said ball valve.

* * * * *

UNITED STATES PATENT AND TRADEMARK OFFICE
CERTIFICATE OF CORRECTION

PATENT NO.   : 6,217,002 B1
DATED        : April 17, 2001
INVENTOR(S)  : Shafer

It is certified that error appears in the above-identified patent and that said Letters Patent is hereby corrected as shown below:

Title page,
Item [56] References Cited, under U.S. PATENT DOCUMENTS, please add the following reference considered but not listed:

-- 4,260,131    * 4/1981       Kindersley       251/315.05 --

Signed and Sealed this

Twenty-seventh Day of November, 2001

Attest:

NICHOLAS P. GODICI
Attesting Officer    Acting Director of the United States Patent and Trademark Office